Patented Oct. 23, 1923.

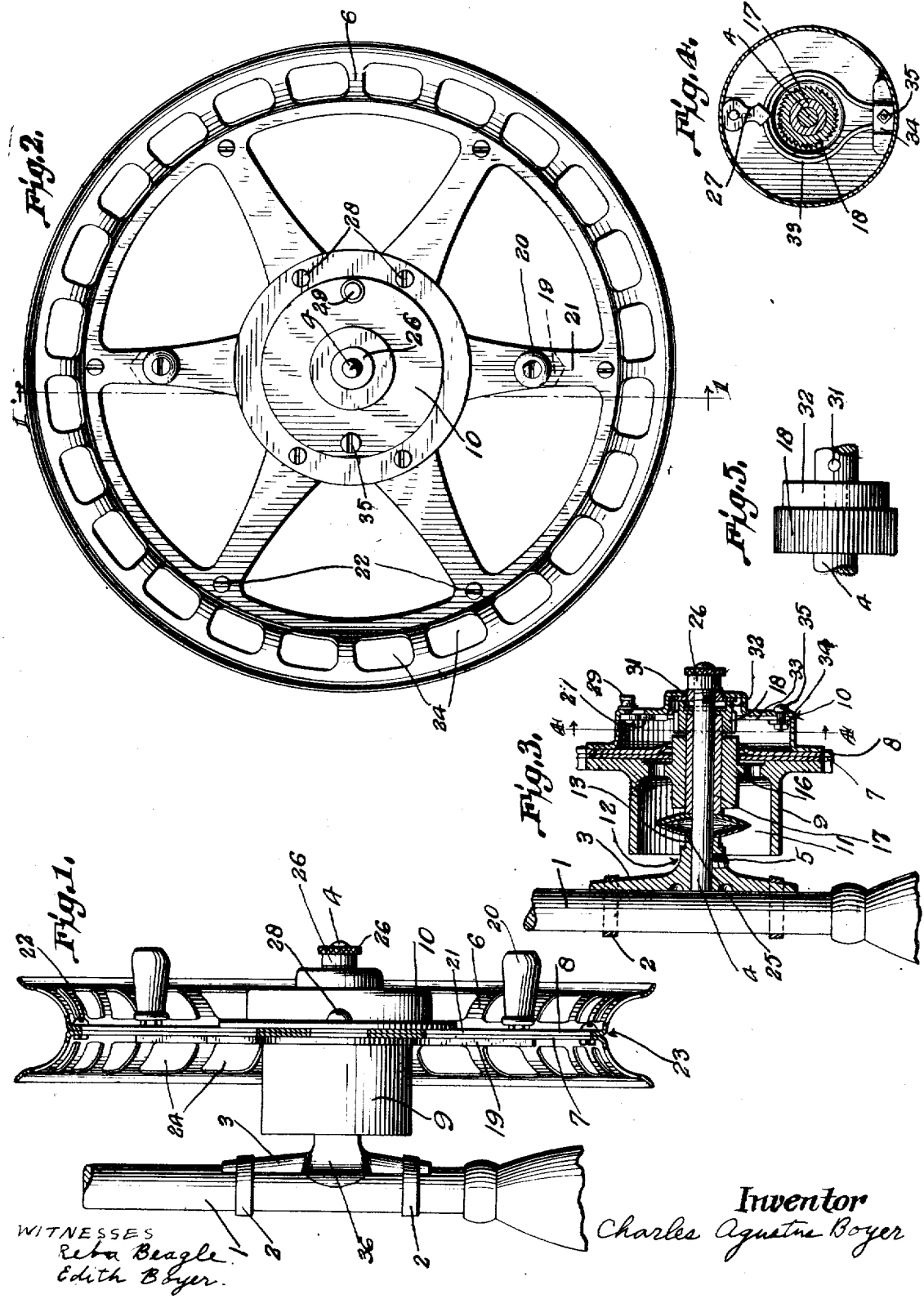

1,471,377

UNITED STATES PATENT OFFICE.

CHARLES AGUSTUS BOYER, OF WINONA LAKE, INDIANA.

FISHING REEL.

Application filed August 5, 1921. Serial No. 490,057.

*To all whom it may concern:*

Be it known that I, CHARLES AGUSTUS BOYER, a citizen of the United States, and a resident of Winona Lake, county of Kosciusko, and State of Indiana, have invented a certain new and useful Fishing Reel, of which the following is a specification.

My invention relates to improvements in fishing reels; and the objects of my improvement are to provide a reel of very simple, and inexpensive construction, light weight, of a design particularly adaptable to manipulating with either hand, equipped with click, and drag of variable tension, and so arranged as to be readily assembled and disassembled.

I attain these and other objects as will appear more fully hereinafter, by the device illustrated in the accompanying drawing, in which—

Figure 1 is a plan view of the reel, and a portion of the rod to which it is attached; Fig. 2, a side elevation of the reel; Fig. 3, a central longitudinal section through the mounting of the reel; Fig. 4, a section of the shaft showing click pinion assembly; and Fig. 5, a view of the entire click assembly.

In the drawings there is shown a rod, 1, with the usual sliding rings 2, for attaching the reel hereafter described.

The reel consists essentially of a base plate 3, provided for attachment to rod by sliding rings 2, this base plate drilled to receive axle 4, which is secured by set screws 5, and revolving around said axle 4, is the complete spool assembly constituted by the spool proper 6, composed of two circular plates, 7 and 8, formed from appropriate sheet metal, preferably aluminum, hub 9, the click and drag mechanism and housing 10, therefor.

The base plate, preferably aluminum, is designed to protrude within revolving hub as shown at 11, and is slightly recessed at the edge of the hub as shown at 12, in order to divert line from revolving hub, and thereby prevent any possibility of its entanglement by wedging between base plate and hub. The base plate also is provided with a small cylindrical projection 13, parallel with and surrounding the axle which it helps to support. It is also designed flush with hub on both sides in order to form a thumb-rest while in use by either hand as shown at 36.

The hub 9, preferably aluminum, consists of an outer cylindrical portion 14, an inner cylindrical portion 15, and central body portion 16. The inner cylindrical portion is provided with a bronze bearing 17, centrally located and projecting slightly beyond the hub section toward the base plate and to some appreciable extent at the opposite end, sufficient to accommodate click pinion 18. The bronze bearing is designed to accurately receive the axle. The central body portion of the hub is of circular design, except for two opposite elongations 19, designed to receive handles 20, fastened therein by means of screws, and correspond in contour to opposite spokes of the spool as shown at 21.

The spool, preferably aluminum, is composed of two plates, blanked and formed as illustrated, and securely fastened together by screws 22, forming the winding groove 23, which is ventilated by openings 24. Obviously this spool, secured to the hub by handle screws, also screws 28, is rotated about the axle by means of either of the handles 20.

Two opposed saucer shaped washers 25, are interposed between base plate and hub. The click pinion 18, also serves as a hub cap to retain the spool upon the axle. It is restrained from revolving with the hub by having a slot crosswise in its outer end, and a pin 31, passing through axle and engaged by this slot permits a movement of the click pinion toward the hub, but prevents it from rotating. A collar 32, around slotted portion of click pinion serves to retain click pin 31. An adjusting nut 26, is provided on outer end of axle 4, and the function of this adjusting nut is that when it is screwed against the click pinion, the result is that the click pinion, being slidably mounted on the axle, will press against the hub and force the hub against the resilient washers. This feature constitutes the novel drag that I have provided, and it is obvious that more or less resistance can be obtained according to the pressure that may be applied by the adjusting nut.

The click 27, is secured to housing 10, by push button 29. The click spring 33, is held in housing 10, by the clamps 34, and screw 35. The click is held either in or out of engagement with the click pinion as the click is moved toward or away from the click pinion. As the click pinion cannot rotate, it is obvious that the click operates by rotation around the pinion.

This reel is equally well manipulated by either hand and incorporates the important features desired in a modern reel. The moving parts may be instantly disassembled by slightly releasing axle set screw 5, and just as easily reassembled by replacing the parts and again tightening said set screw. Thus it becomes evident that my improved fishing reel is designed to combine supreme simplicity, light weight, and efficient operation.

What I claim to secure by Letters Patent is:

1. A fishing reel including a base plate and a spool and hub assembly revolvable about an axle, said base plate being elongated on each side to form thumb rests.

2. A fishing reel including a base plate and a spool and hub assembly revolvable about an axle, said base plate being elongated on each side so as to extend flush with hub thereby forming thumb rests.

3. A fishing reel including a base plate and a spool and hub assembly revolvable about an axle, said base plate extending flush with revolvable hub in such a manner as to form a rest for the thumb of either left or right-handed use.

In testimony whereof I have affixed my signature in presence of two witnesses.

CHARLES AGUSTUS BOYER.

Witnesses:
  REBA BEAGLE,
  EDITH BOYER.